United States Patent
Higgins et al.

(10) Patent No.: US 8,667,687 B2
(45) Date of Patent: Mar. 11, 2014

(54) SUMP ENTRY FITTING

(75) Inventors: Jeromy E. Higgins, Clayton, NC (US);
Kristopher A. Kane, Fairfield, OH (US); Kevin A. Webster, Clayton, NC (US)

(73) Assignee: OPW Fueling Containment Systems, Inc., Smithfield, NC (US)

( * ) Notice: Subject to any disclaimer, the term of this patent is extended or adjusted under 35 U.S.C. 154(b) by 141 days.

(21) Appl. No.: 13/192,138

(22) Filed: Jul. 27, 2011

(65) Prior Publication Data

US 2013/0025107 A1 Jan. 31, 2013

(51) Int. Cl.
*B21D 51/16* (2006.01)

(52) U.S. Cl.
USPC .............................. 29/890.14; 29/450; 29/237

(58) Field of Classification Search
USPC ......... 29/450, 890.14, 237; 285/148.3, 148.8, 285/148.28, 205–208, 213, 215
See application file for complete search history.

(56) References Cited

U.S. PATENT DOCUMENTS

| | | | |
|---|---|---|---|
| 4,890,867 A * | 1/1990 | Briggs et al. .................. 285/256 |
| 5,129,684 A * | 7/1992 | Lawrence et al. .......... 285/288.1 |
| 5,439,259 A * | 8/1995 | Taga et al. ................... 285/334.5 |
| 5,501,472 A | 3/1996 | Brancher et al. |
| 5,704,656 A * | 1/1998 | Rowe ............................... 285/93 |
| 5,722,699 A | 3/1998 | Brancher |
| 5,813,797 A | 9/1998 | Pendleton et al. |
| 5,819,975 A | 10/1998 | Pendleton et al. |
| 5,961,155 A | 10/1999 | Youngs |
| 5,967,567 A | 10/1999 | Nordstrom |
| 6,173,997 B1 | 1/2001 | Nordstrom et al. |
| 6,189,550 B1 * | 2/2001 | Stickel et al. ................. 134/174 |
| 6,224,115 B1 * | 5/2001 | Blasch et al. .............. 285/139.2 |
| 6,612,620 B1 | 9/2003 | Nordstrom et al. |
| 6,886,388 B1 | 5/2005 | McGill et al. |
| 6,986,622 B2 | 1/2006 | Ageheim et al. |
| 7,181,859 B2 | 2/2007 | Lai |
| 7,401,621 B2 | 7/2008 | McCann |
| 7,708,286 B2 * | 5/2010 | Henry ........................... 277/607 |
| 7,758,084 B2 * | 7/2010 | Boudry et al. ............. 285/139.3 |
| 8,297,660 B2 * | 10/2012 | Rosch ............................ 285/236 |
| 2004/0160055 A1 * | 8/2004 | Newton ....................... 285/21.1 |
| 2009/0199927 A1 * | 8/2009 | Kane et al. ...................... 141/98 |
| 2011/0233924 A1 * | 9/2011 | Kenney et al. ............. 285/139.2 |

OTHER PUBLICATIONS

"(PTFE) Polytetrafluoroethylene." Bearing Works Inc. Web. Sep. 28, 2010. <http://www.bearingworks.com/content_files/pdf/retainers/PTFE%20datasheet.pdf>.*
"Thermoplastics—Physical Properties." The Engineering Tool Box. Web. Feb. 24, 2006. <http://www.engineeringtoolbox.com/physical-properties-thermoplastics-d_808.html>.*

* cited by examiner

*Primary Examiner* — David Bryant
*Assistant Examiner* — Justin Sikorski
(74) *Attorney, Agent, or Firm* — Thompson Hine L.L.P.

(57) ABSTRACT

An entry fitting system including a generally rigid body configured to extend through an opening of a containment chamber and a generally flexible seal configured to be positioned in the body. The system further includes an insert configured to be coupled to the body and cause the seal to sealingly engage a pipe received through the body, wherein the seal is configured to enable the sealingly engaged pipe to be oriented in a non-parallel position with respect to a central axis of the body.

29 Claims, 15 Drawing Sheets

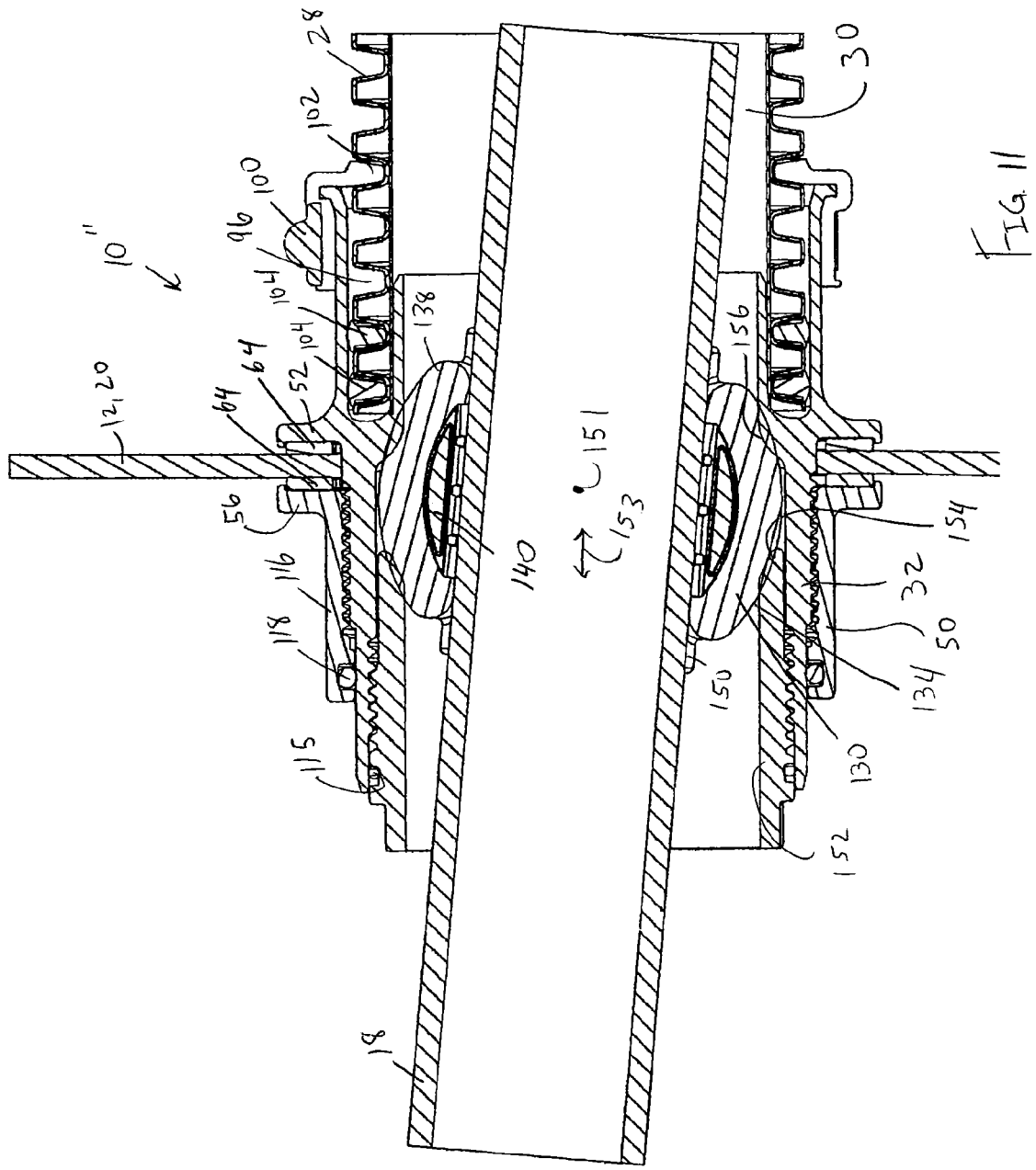

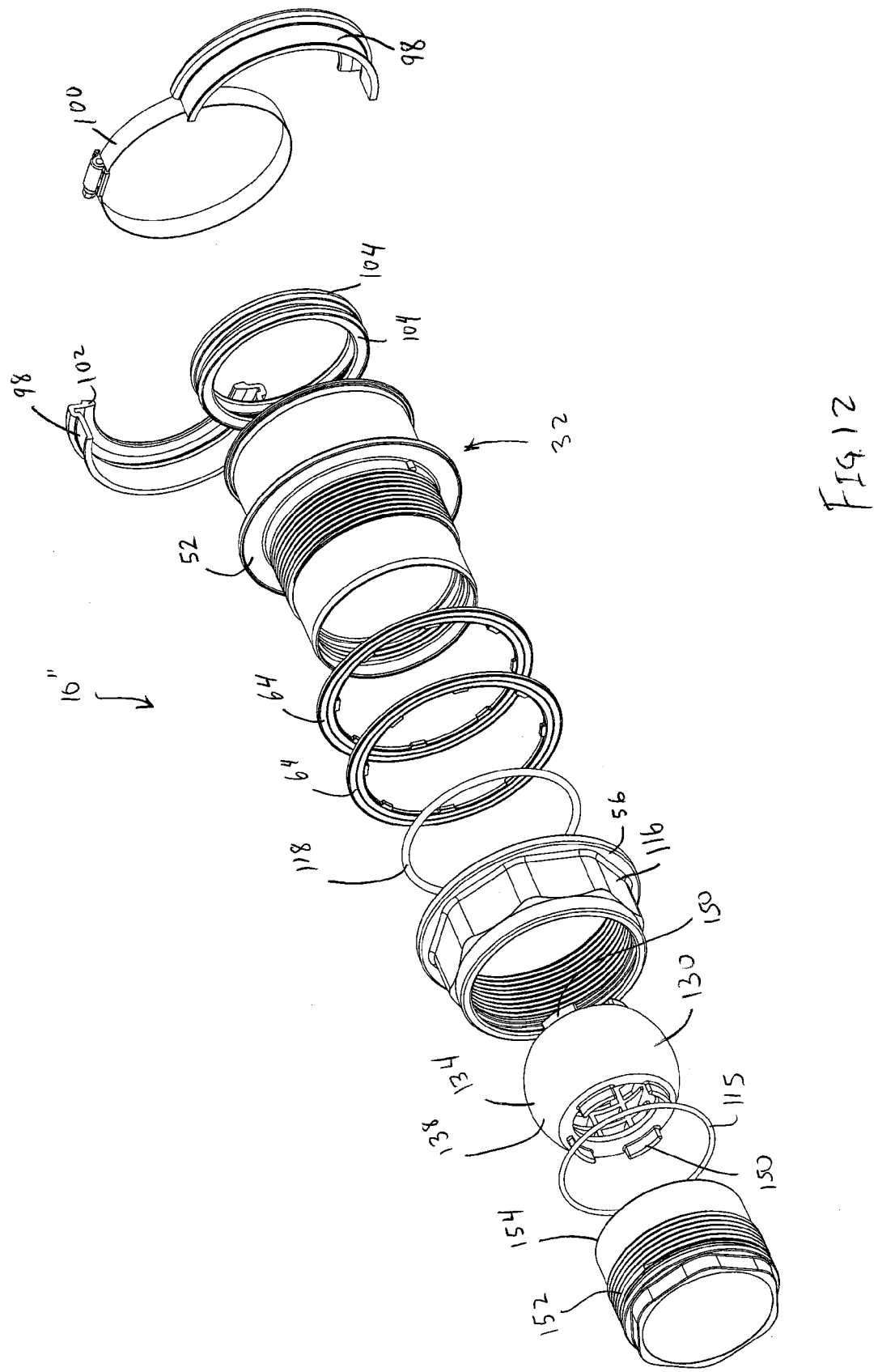

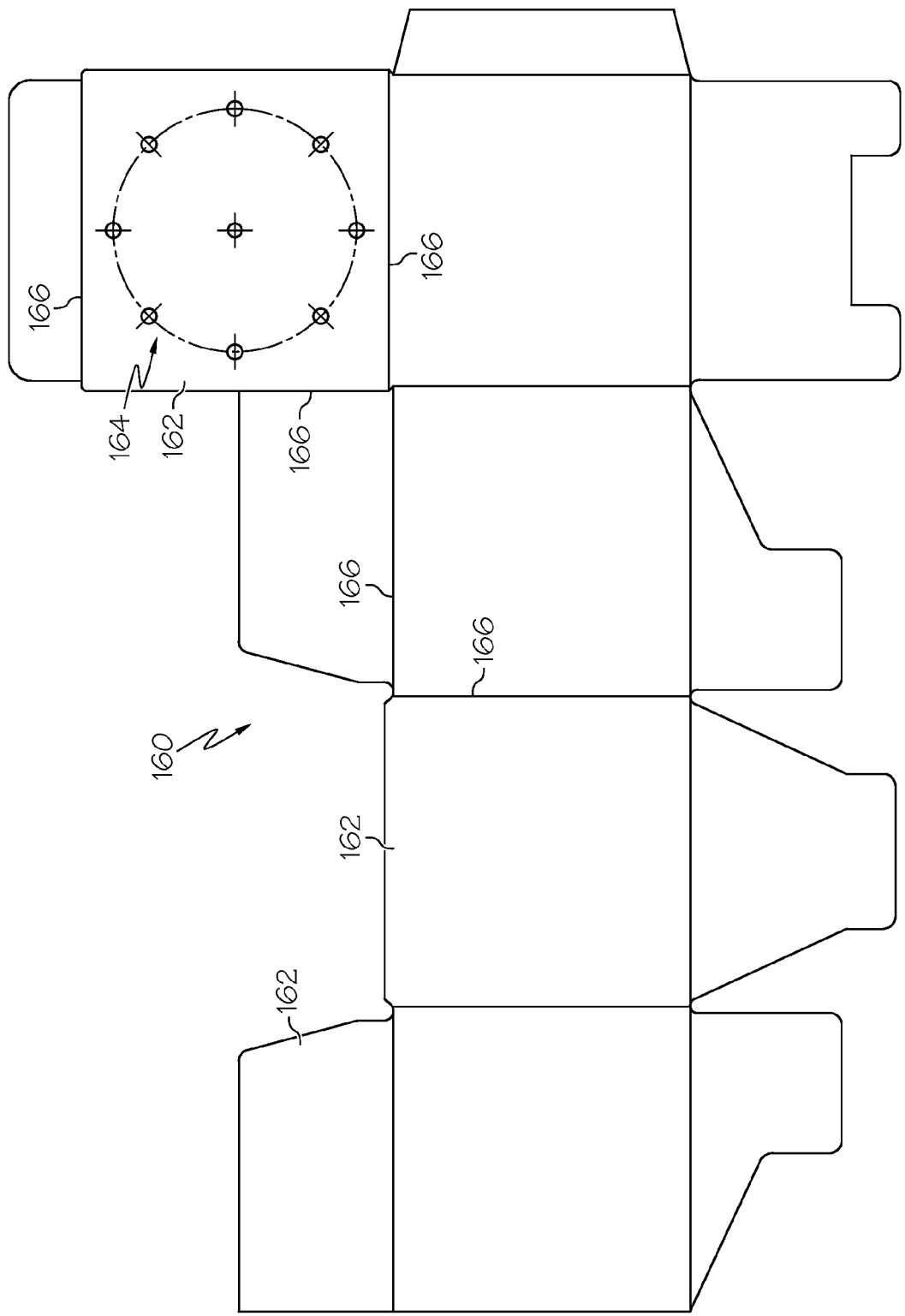

SUMP ENTRY FITTING

BACKGROUND

Fluid handling systems, such as fuel conduit and piping at gas stations and the like, often include or are utilized in conjunction with sumps or containment chambers. Sumps may be used for receiving and containing pumps, pipe junctions, or other fluid handling equipment. It is often desired that the fluid-containing pipe penetrate through the sump walls in a fluid-tight manner to contain any leaks therein. The sump entry fitting should be made of a sufficiently durable and stable material. Moreover, during assembly or maintenance of such fluid-handling systems, or at other times, the pipes and conduit may be arranged at various angles due to underground forces and imprecise tolerances, limitations in positioning of the components, etc.

SUMMARY

Accordingly, in one embodiment the sump entry fitting of the present invention is made of a relatively rigid, durable and stable material, but provides sufficient flexibility to accommodate movement or misalignment of the pipes/conduits with the sump entry fitting. More particularly, in one embodiment the invention is an entry fitting system including a generally rigid body configured to extend through an opening of a containment chamber and a generally flexible seal configured to be positioned in the body. The system further includes an insert configured to be coupled to the body and cause the seal to sealingly engage a pipe received through the body, wherein the seal is configured to enable the sealingly engaged pipe to be oriented in a non-parallel position with respect to a central axis of the body.

BRIEF DESCRIPTION OF DRAWINGS

FIG. 11 is a side cross section of the sump and pipe of FIG. 10, with the pipe shown at an angle;

FIG. 12 is an exploded perspective view of the sump entry fitting of FIG. 10;

FIG. 16 is a top view of a package which may be used to store and ship a sump entry fitting.

DETAILED DESCRIPTION

Figure 1:
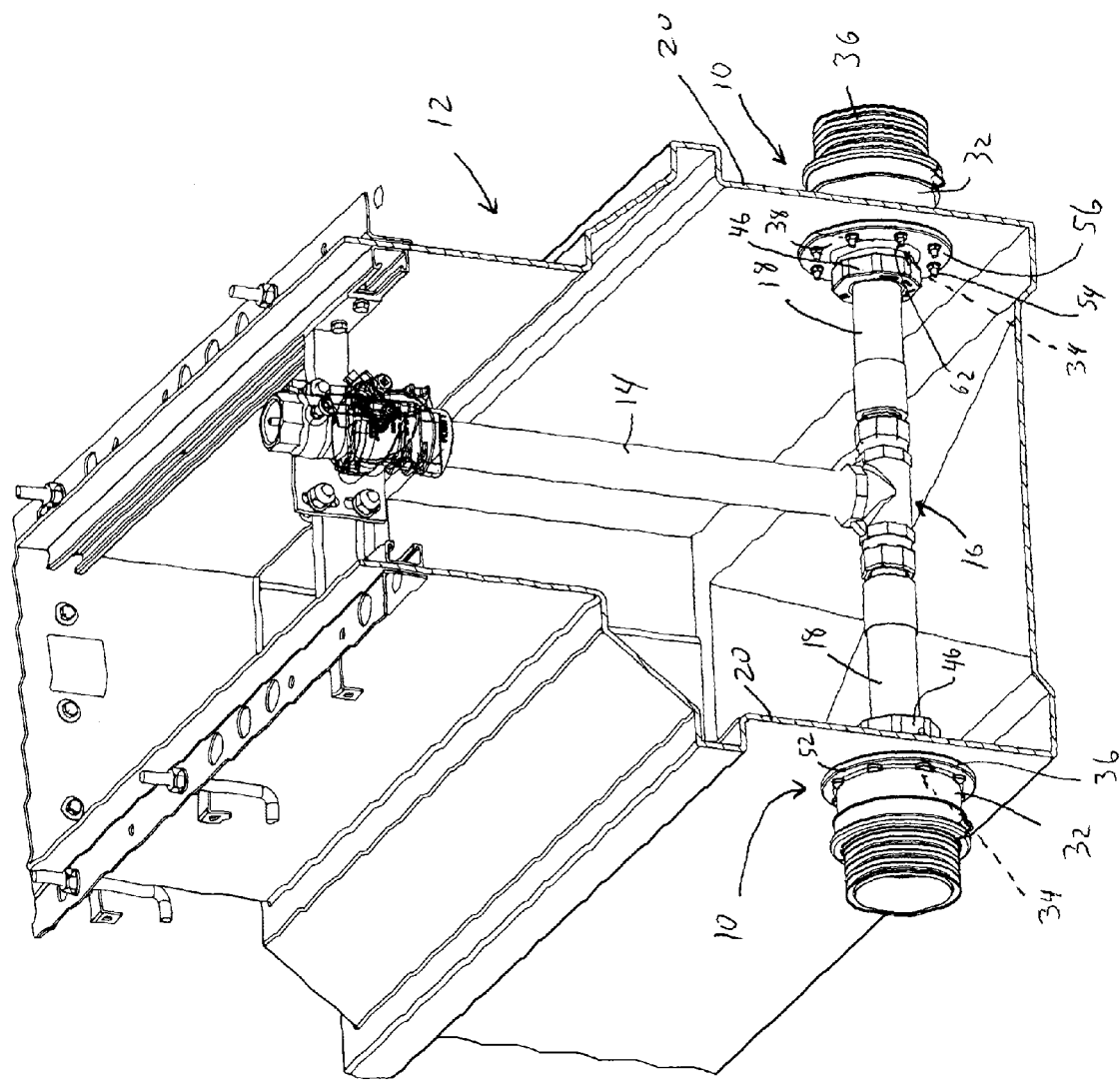
FIG. 1 is a front perspective cut-away view of a sump including one embodiment of a sump entry fitting.

As shown in FIG. 1, one or more sump entry fittings 10 may be used in conjunction with a sump, containment chamber 12 or the like. The sump 12 may be fluid tight and generally sealed to contain leaks of any fluid therein and can contain, for example, pipe junctions, pumps, the bottom portion of fluid dispensers, or other fluid processing equipment. In the particular embodiment shown in FIG. 1, a riser pipe 14, which connects to an above-ground fluid dispensing unit (not shown, but in one embodiment is a fuel dispensing unit at a gas or refueling station), is coupled to a horizontal run of pipe 16. However, the sump 12 can receive and contain various other types of components or equipment therein. Moreover, the sump entry fitting 10 can be used to couple a wide variety of pipes to various different types of walls/sumps/containment chambers 12, in a variety of configurations.

Figure 2:
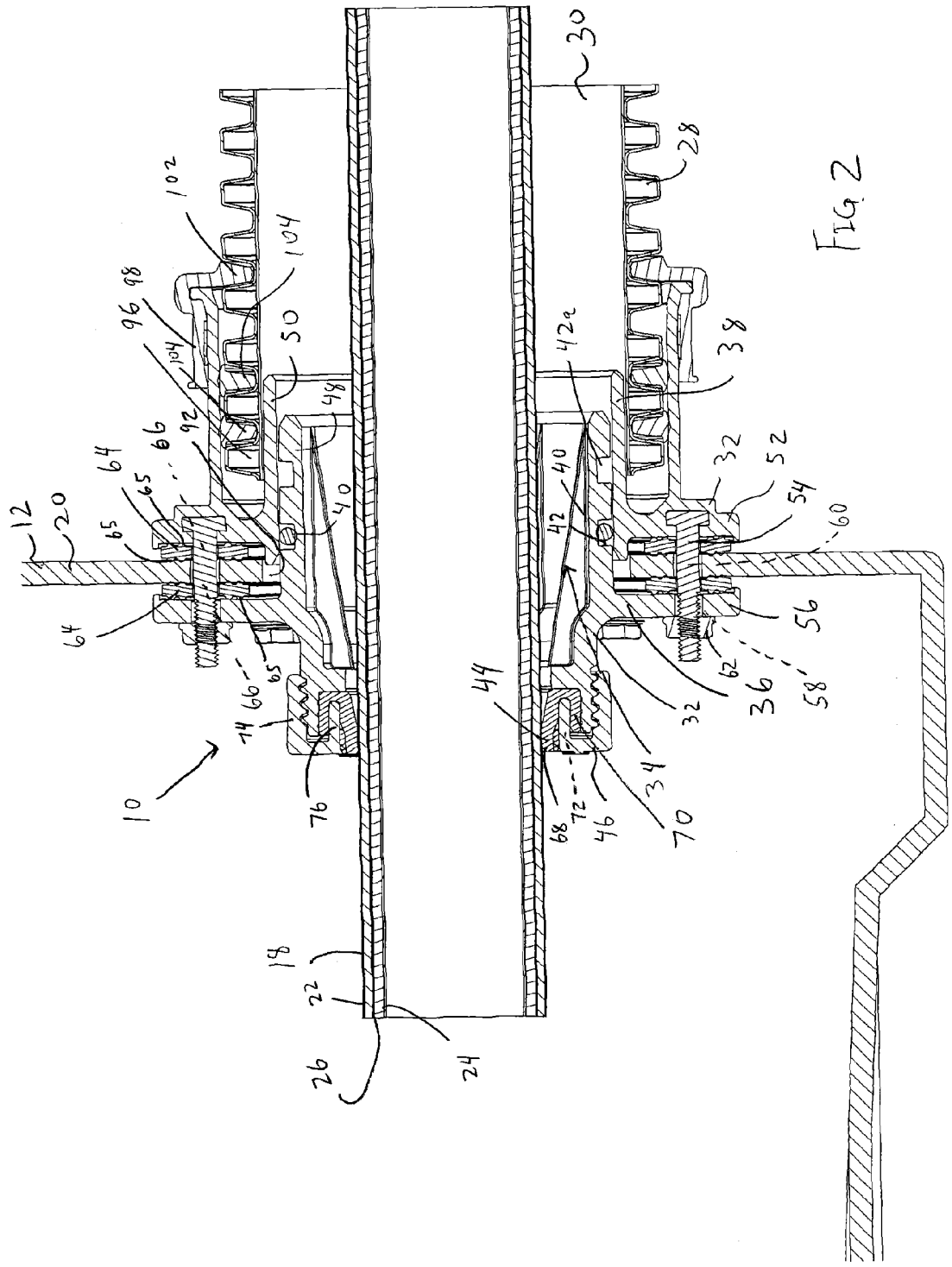
FIG. 2 is a side cross section of the sump entry fitting of FIG. 1.
Figure 3:
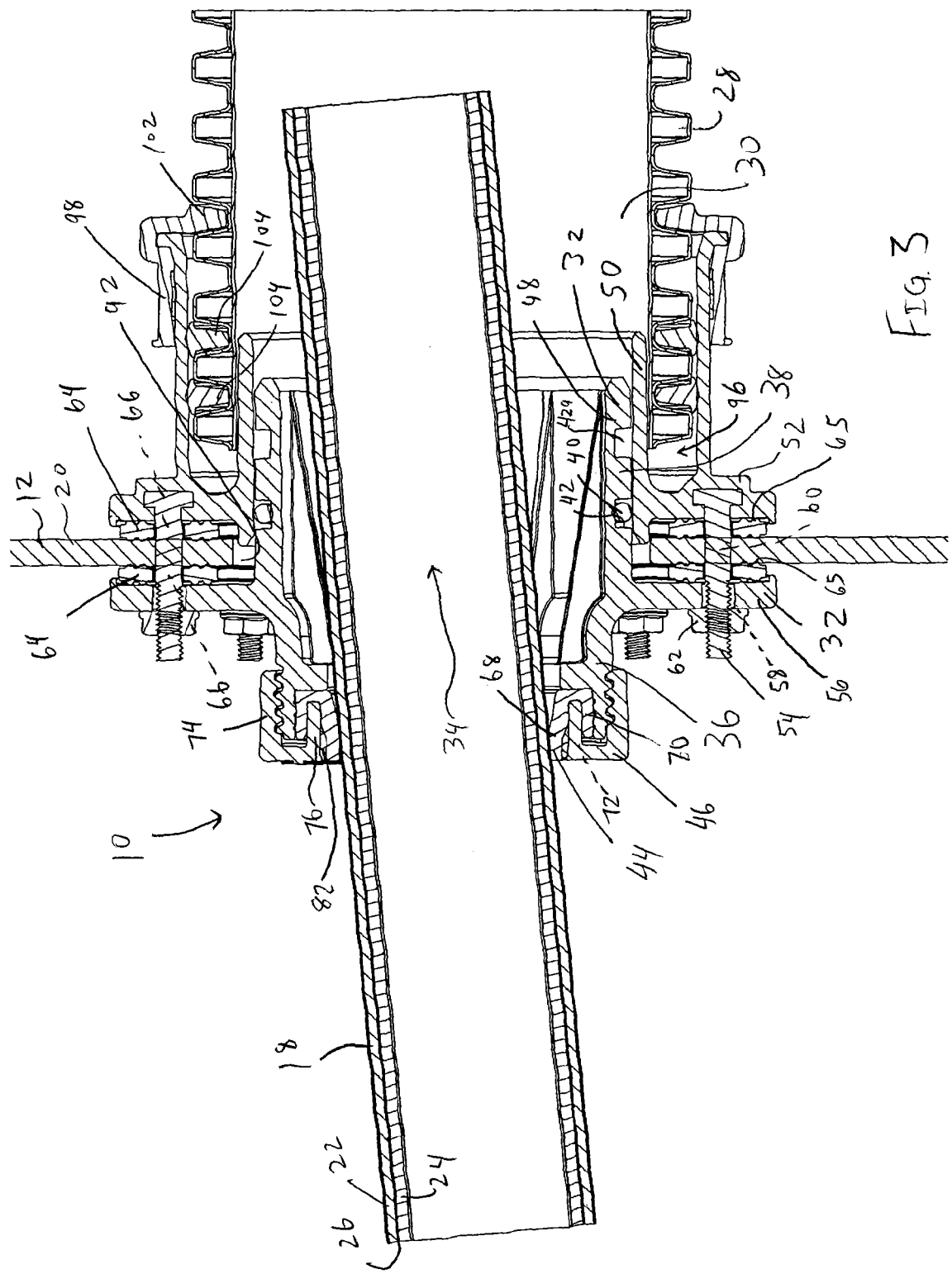
FIG. 3 is a side cross section of the sump entry fitting of FIG. 1 with the pipe shown at an angle.
Figure 4:
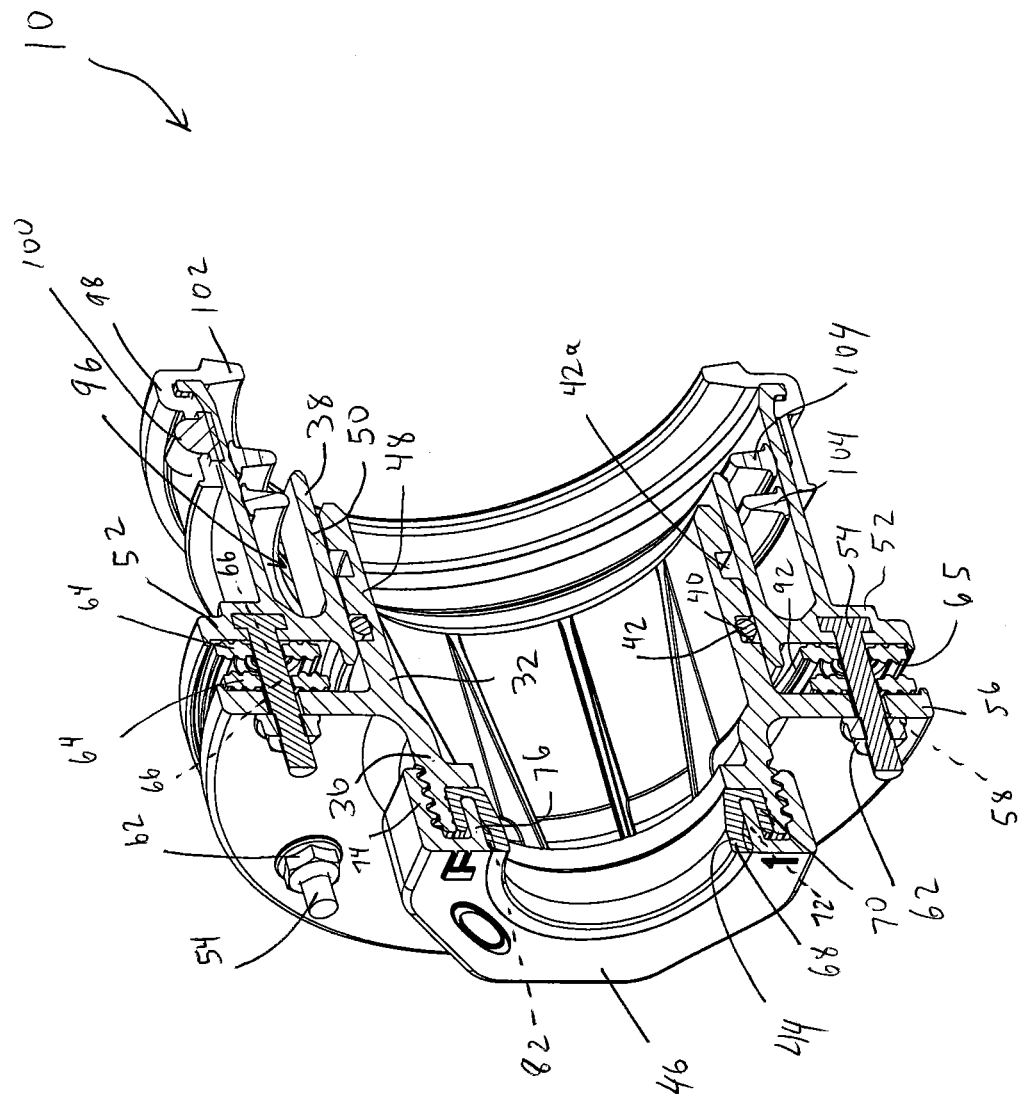
FIG. 4 is a perspective cut-away view of the sump entry fitting of FIG. 2.

As best shown in FIGS. 2 and 3, the sump entry fitting 10 may be used to seal a pipe 18 passing through a wall 20 of the sump 12. In the illustrated embodiment, the pipe 18 is a coaxial pipe including an outer portion 22 and an inner portion 24 with a sealed interstitial space 26 therebetween, although the pipe 18 need not necessarily include the inner portion 24 or the interstitial space 26. Moreover, in the illustrated embodiment, the pipe 18 includes or is associated with an outer corrugated sleeve 28 extending thereabout to protect the pipe 18, and providing a second interstitial space 30 between the corrugated sleeve 28 and pipe 18. In one case the pipe 18 is configured to convey any of a wide variety of fluids, liquids or fuels, including but not limited to petroleum-based fuels, such as gasoline, diesel, natural gas, biofuels, blended fuels, propane, oil or the like, or ethanol the like. However, the sump entry fitting 10 can be used in conjunction with a wide variety of pipes in various configurations.

In one embodiment, the sump entry fitting 10 includes a body 32 positioned in and extending through an opening 34 of the sump 12 and receiving the pipe 18 therethrough. In the illustrated embodiment the opening 34 is generally circular, and the body 32 is generally cylindrical to closely fit in the opening 34. The body 32 may include a first, or axially inner portion 36, slidably received in a second, or axially outer portion 38. An O-ring or the like 40 is received in an annular groove 42 of the inner body portion 36 to ensure that the inner 36 and outer 38 portions sealingly engage each other. The body 32 may includes a supplemental groove 42a, positioned axially outside the groove 42, which is configured to receive a supplemental O-ring 40 or the like as a supplemental seal, or to provide a seal should the wall 20 be relatively thick, requiring the inner 36 and outer 38 to be moved axially apart from their positions shown in FIGS. 2 and 3.

The fitting 10 includes a seal 44 received at an axially inner end of the body 32 and configured to sealingly engage the pipe 18. The sump entry fitting 10 further includes a seal insert 46 threadably coupled to an outer surface of the body 32 and configured to engage the seal 44 and urge the seal 44 into sealing contact with the pipe 18.

In order to assemble the sump entry fitting as shown in FIGS. 2 and 3, the outer portion 38 of the body 32 is positioned outside the sump 12/wall 20, and the inner portion 36 is positioned inside the sump 12/wall 20. An inner cylindrical portion 48 of the inner body portion 36 is then passed through the opening 34 and slid into a complementarily-shaped and sized cylindrical portion 50 of the second body portion 38 such that the O-ring 40 or other sealing member forms a seal therewith.

In the illustrated embodiment, the outer body portion 38 includes an outer flange 52 positioned adjacent to the wall 20. The outer flange 52 has a plurality of axially-inwardly extending threaded studs 54 spaced about its periphery in a circular pattern. The inner body portion 36 also includes an outer flange 56 positioned adjacent to the wall 20, and has a plurality of openings 58 spaced about its periphery. The wall 20 has a plurality of openings 60 extending in a circular pattern about the central opening 34. In this manner each stud 54 is closely received through a corresponding opening 60 of the sump wall 20 and opening 58 of the outer flange 56. A nut or threaded fastener 62 is threaded on the protruding end of each stud 54 to couple the outer 38 and inner 36 body portions together, with the wall 20 therebetween.

A pair of generally flat annular containment seals 64 may be positioned between each outer flange 52, 56 and the sump wall 20. Each containment seal 64 includes a plurality of circular openings 66 formed therein to closely receive the studs 54 therethrough. Each containment seal 64 may also include a series of protrusions 65 carried on either side thereof to aid in forming a seal with the sump wall 20. In this manner, when the nuts 62 are tightened down over the studs 54, the body portions 36, 38 are pulled into tight engagement with the containment seals 64 to form a fluid-tight engagement with the sump wall 20 and couple the body 36, 38 portions together. The slidable nature of the body portions 36, 38 and the attachment via the nuts 62 and studs 54 enables the sump entry fitting 10 to be mounted to walls 20 of different thicknesses.

After the body 32 is positioned in the opening 34 and coupled to the sump wall 20, the seal 44 and seal insert 46 may be positioned loosely on the axially inner end of the inner body portion 36. The illustrated seal 44 is generally annular having an annular body 68, an outer flange 70 and a recess 72 positioned therebetween. The seal 44 is closely received in the inner body portion 36. The seal insert 46 is correspondingly shaped with the seal 44, having an outer body 74 and an annular flange 76 which is received in the recess 72 of the seal 44. The seal insert 46 is positioned over, and threadably engages, the outer surface of the body 32 (although the seal insert 46 could alternately engage an inner surface of the body 32). After the seal 44 and seal insert 46 are loosely positioned in place, the pipe 18 is then passed through the opening 34 and fitting 10.

Figure 6:
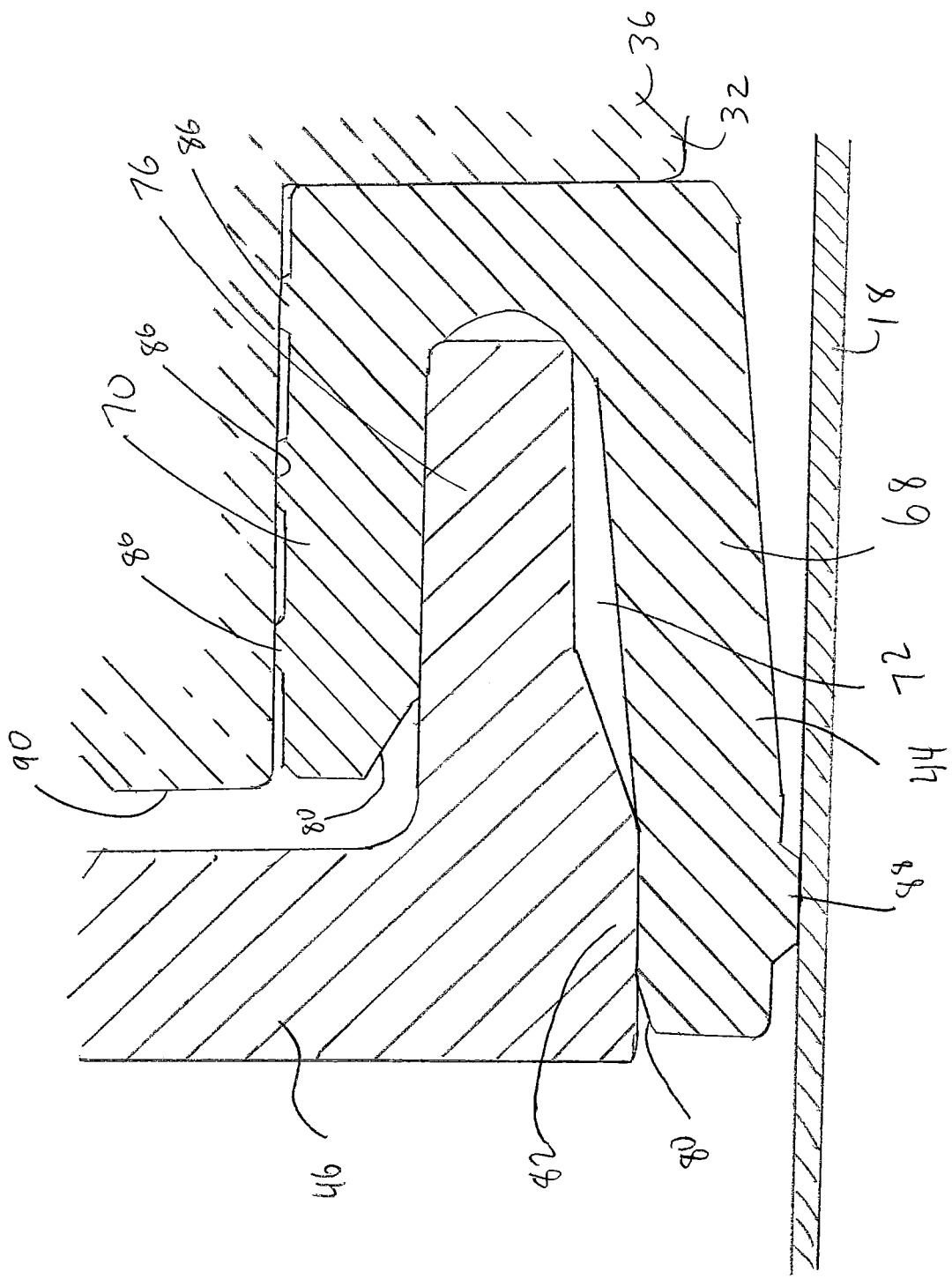
FIG. 6 is a detailed view of the seal and pipe of FIG. 2.

After the pipe 18 is passed through the fitting 10, the seal insert 46 is further threaded onto the body 32, thereby urging the flange 76 of the insert 46 into the recess 72 of the seal. As best shown in FIG. 6, the seal 44 may include a pair of inwardly-tapered surfaces 80, adjacent to the recess 72, to guide the flange 76 into the recess 72 as the insert 46 is threaded into place. In addition, the flange 76 of the seal insert 46 includes a radially inwardly-extending protrusion 82 at its axially inner end which is configured to engage the body 68 of the seal 44 and urge the body 68 radially inwardly into sealing contact with the pipe 18 as the seal insert 46 is screwed into place.

The flange 70 of the seal 44, in the illustrated embodiment, includes one or more protrusions 86 on its radially outer surface (three protrusions 86 being shown in the illustrated embodiment), which are configured to sealingly engage the body 32. Moreover, the body 68 of the seal 44, in the illustrated embodiment, includes one or more protrusions 88 which are configured to sealingly engage the pipe 18. The seal insert 46 and body 32 may be arranged such that when the seal insert 46 is fully threaded down (i.e. the sealing insert 46 engages the axial end surface 90 of the body (FIG. 6)), the seal 44 is deformed radially inwardly the desired amount to achieve the optimum seal with the pipe 18.

Thus, the sump entry fitting 10 and method of installation described above and shown herein provides each of installation and repeatability. This system also allows the sump entry fitting 10 to seal to the sump 12/wall 20, thus forming a seal with the sump 12/wall 20 that is independent of the seal with the pipe 18. Should the seal 44 need to be replaced, it can be easily removed simply by unthreading the seal insert 46, inserting a new seal 44 and threading the seal insert 46 in place. The seal 44 can thus be accessed and replaced without having to decouple the sump entry fitting 10 from the sump wall 20. In addition, the sump entry fitting 10 is removably coupled to the sump 12/wall 20 so that the fitting 10 can be removed or replaced if necessary, and is not permanently coupled to the sump 12/wall 20, such as by fusion welding or the like.

The sump entry fitting 10 may also include or define an annular gap or cavity 92 (FIGS. 2 and 3) positioned between the inner 36 and outer 38 body portions and the sump wall 20, and the gap 92 is sealed by the O-ring 40 and containment seals 64. A pressure sensor, fluid sensor or other sensing instrument can be inserted into or fluidly coupled to the gap 92 to monitor the integrity of the sump entry fitting 10 at that position. In this manner, the gap 92 enables the seal that the sump entry fitting 10 forms with the sump wall 20 to be monitored independently of the seal that the fitting 10 forms with the pipe 18.

The insert 46 is shown as being threadably coupled to the body 32. However, rather than being threadably coupled, the insert 46 could be movably coupled to the body 32 by various other arrangements, such as a ratchet-type fitting or the like. The same is true of other threadable connections shown and described herein.

In one embodiment, the body 32 and seal insert 46 are made of relatively rigid materials, such as glass-filled nylon, ceramic-filled nylon, metals (including steel), polyethylene or the like, or other stable, durable, tough material which is resistant to corrosion or breakdown, particularly by water or hydrocarbon materials and are compatible with water, oil, gasoline, gasoline blends, alcohols, kerosene, fuel oil, hydrocarbons, biodiesel, etc. In one embodiment, the relatively rigid materials for the body 32/seal insert 46 may have a Young's modulus of at least about 15,000 psi.

The seal 44 can be, in one embodiment, made of a relatively flexible material such as, for example, rubber (including nitrile rubber and viton rubber), rubber-based materials, synthetic rubber, urethane, thermoplastic elastomers or other elastomeric materials. The seal 44 can be made of materials which are resistant to corrosion or breakdown, particularly by water or hydrocarbon materials and is compatible with water, oil, gasoline, gasoline blends, alcohols, kerosene, fuel oil, hydrocarbons, biodiesel, etc. The seal 44 may have a hardness/durometer value of less than about 100 points, or greater than about 30 points, or between about 30 and about 100 points (scale A). The flexible nature of the seal 44 may enable the pipe 18 to pivot relative to the central axis of the seal 44/sump entry fitting 10/opening 34, as shown in FIG. 3. In particular, in one embodiment the pipe 18 may be able to pivot at least about 5° relative to the central axis of the seal 44/sump entry fitting 10/opening 34 to enable the sump entry fitting 10 to accommodate misaligned pipes 18, and/or subsequent movement or shifting of the pipe 18 due to frost heave, settling, etc.

The flexible/elastic nature of the seal 44 enables the seal 44 to be deformed to accommodate such pivoting of the pipe. For example, in the embodiment shown in FIG. 3, when the axially inner end of the pipe 18 is pivoted downwardly, the lower portions of the seal 44 are compressed to enable such pivoting while the upper portions of the seal 44 remain in sealing engagement with the pipe 18 due to the elastic nature of the seal 44, and the insert 46 pressing the seal 44 inwardly. The body 68 of the seal may have a thickness of at least about 1/16" in one case, or at least about 1/8" in one case, or at least 1/4" inch in one case to enable sufficient pivoting of the pipe 18 while maintaining a seal. However, the body 68 of the seal 44 may be desired to not be too thick in some cases, to ensure the seal 44 can be urged/deformed radially inwardly, and thus may have a thickness of less than about 1/2" in one case, and less than about 1" in another case. In one case, the seal 44 is the only generally flexible component in the sump entry fitting 10, and may be positioned closely around the pipe 18 such that the seal 44 has an outer diameter no larger than 25% in one case, or 50% in another case, than the diameter of the pipe 18, and has an axial length less than the diameter or radius of the pipe 18.

Figure 5:
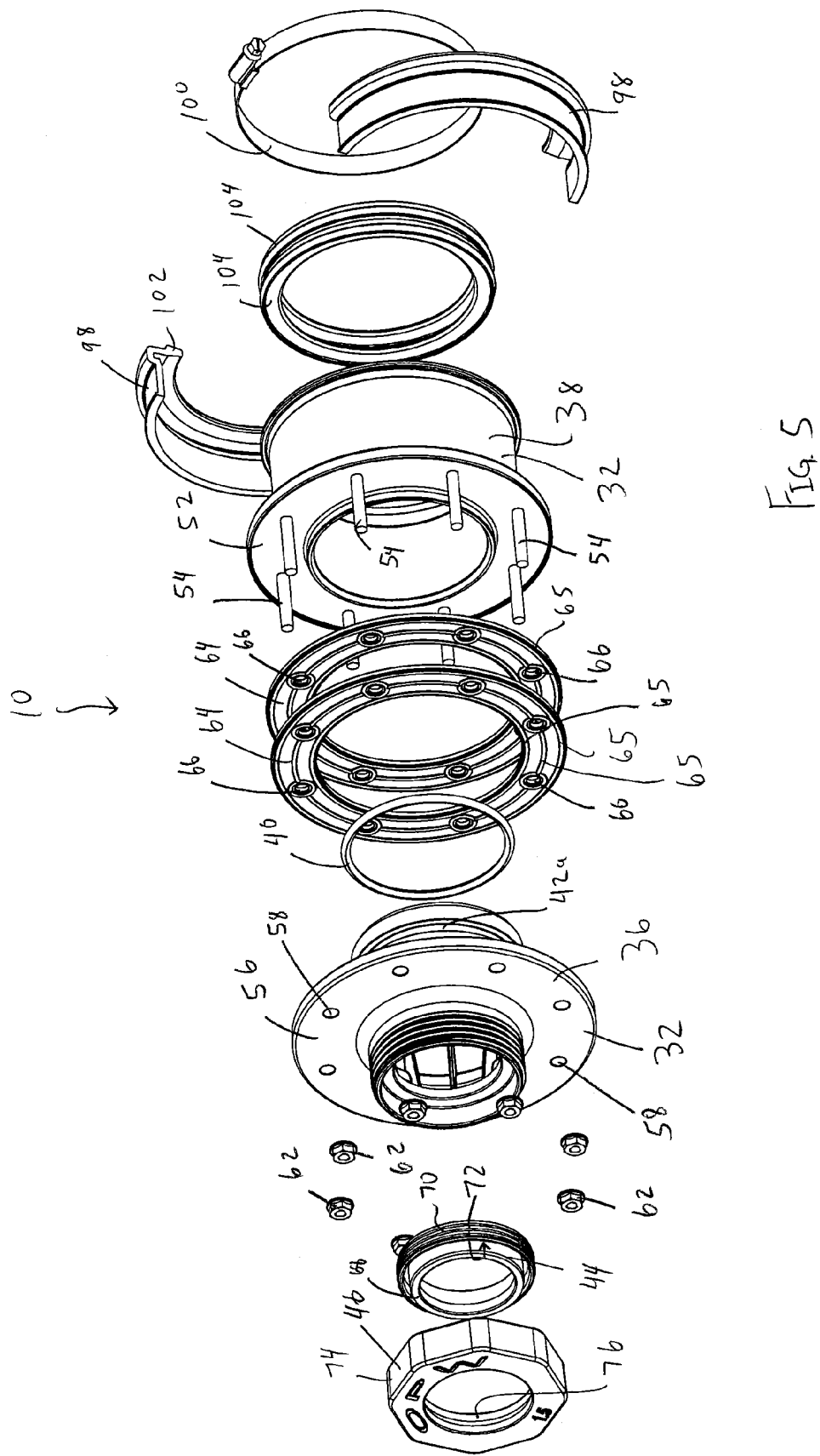
FIG. 5 is an exploded perspective view of the sump entry fitting of FIG. 2.

The pipe 18 may, in one embodiment, remain continuous through the sump entry fitting 10, whereas the corrugated sleeve 28 terminates at the fitting 10/wall 20. Accordingly, the axially outer end of the outer body portion 38 may include an annular recess 96 configured to receive the corrugated sleeve 28 therein. A split retainer ring 98 is positioned about the axially outer end of the body 32, and held in place by a clamp 100 (FIG. 5) passed around the retainer ring 98. The retainer ring 98 includes a radially inwardly-extending protrusion 102 which is received in a corresponding groove of the corrugated sleeve 38 to retain the sleeve 38 in place. One or more seals 104 may be positioned in corresponding grooves of the corrugated sleeve 38 such that the seals 104 sealingly engage the body 32 to provide and maintain a seal within the corrugated sleeve 38.

Figure 7:
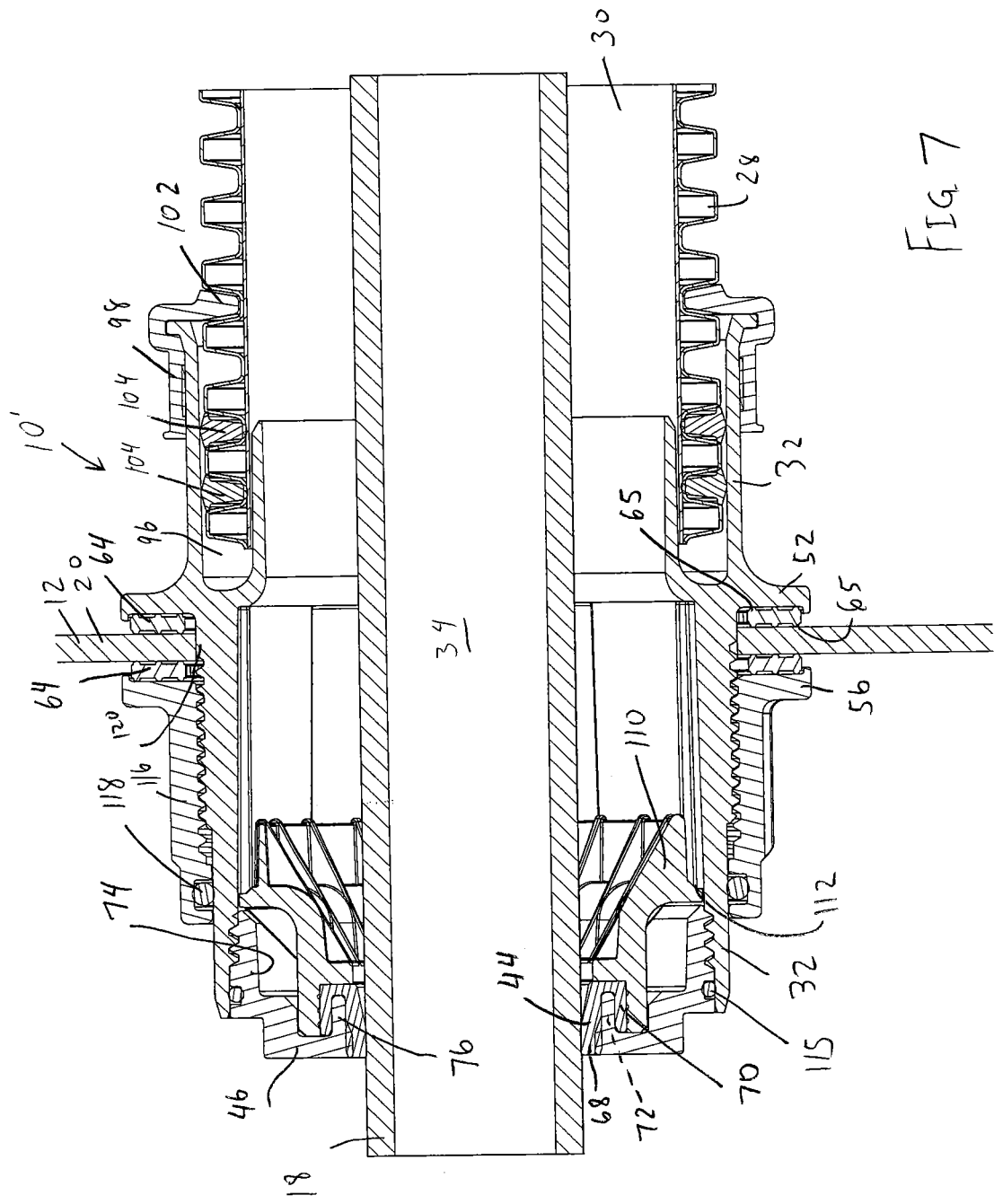
FIG. 7 is a side cross section of a sump and pipe with an alternate sump entry fitting.
Figure 8:
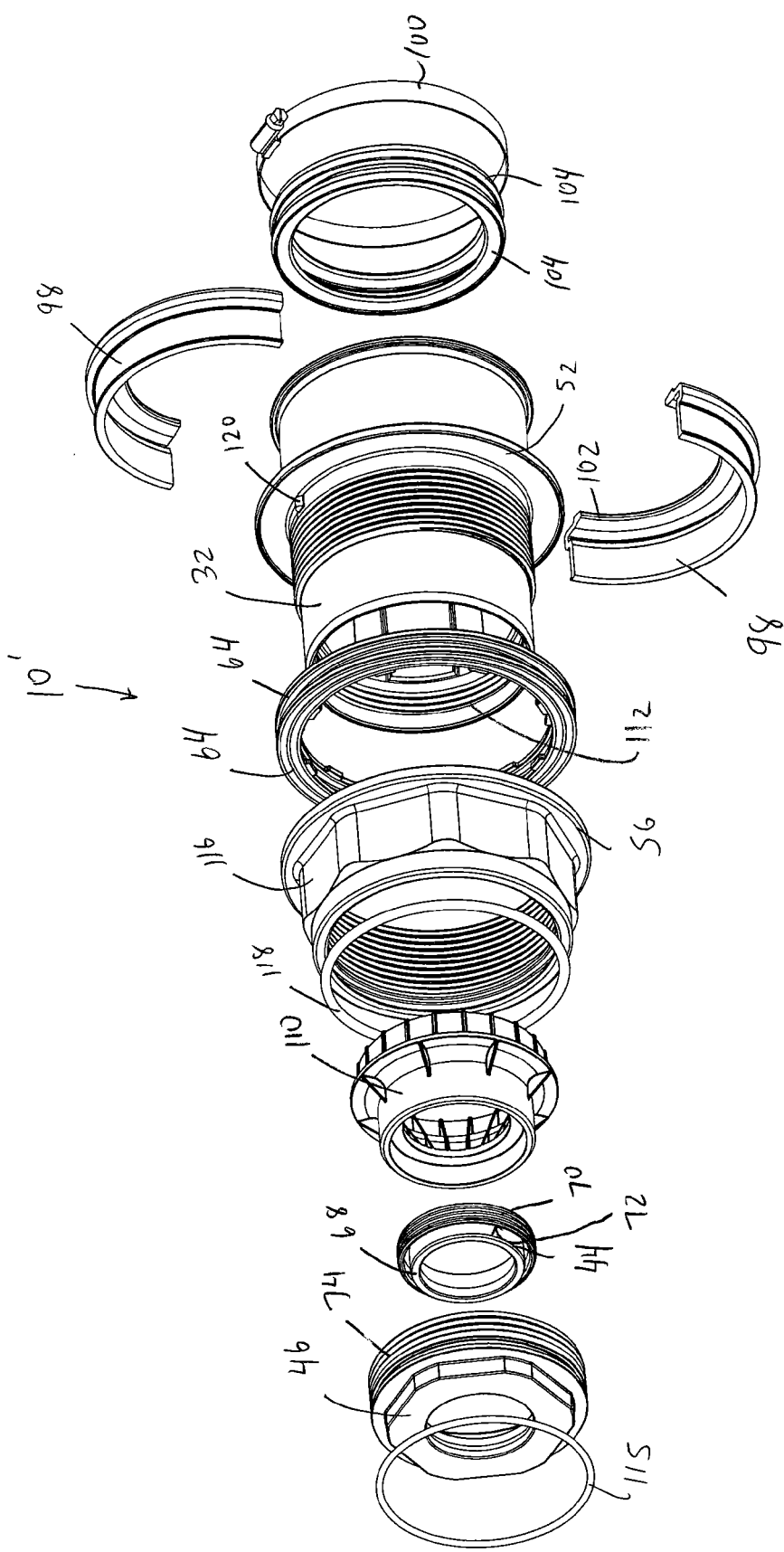
FIG. 8 is an exploded perspective view of the sump entry fitting of FIG. 7.

FIGS. 7 and 8 illustrate an alternate embodiment of the sump entry fitting 10'. In this particular embodiment, the body 32 is a one-piece unitary body, and receives a grommet insert 110 therein. The grommet insert 110 is received against an inner lip 112 of the body 32 to axially locate the grommet insert 110 within the body 32. The grommet insert 110 receives the seal 44 therein. The seal insert 46 is, in the illustrated embodiment, externally threaded (although it could instead be internally threaded) and threadably received inside the body 32 to press the seal 44 into sealing engagement with the pipe 18, in the same or similar manner to that described above for the embodiment of FIGS. 1-6. An O-ring or other sealing member 115 may be positioned between the seal insert 46 and the body 32 to aid in forming a sealing engagement.

Since the body 32 is, in this embodiment, formed of a unitary or single piece of material, the body 32 is inserted into the containment chamber from the outside thereof. In particular, the axially inner end of the body 32 is inserted through the opening 34 and into the sump 12. The outer flange 52 of the body 32 is positioned adjacent to the sump wall 20, and a containment seal 64 is positioned between the flange 52 and the wall 20. In order to secure the sump entry fitting 10' in place and seal the sump entry fitting 10' with respect to the sump wall 12, a sleeve 116 carrying a flange 56 may be provided and threadably coupled to an outer surface of the body 32. An O-ring or other sealing body 118 is positioned between the sleeve 116 and the body 32. As the sleeve 116 is threaded onto the body 32, the flange 56 of the sleeve 110 urges the containment seals 64 into sealing engagement with the wall 12.

Figure 9:
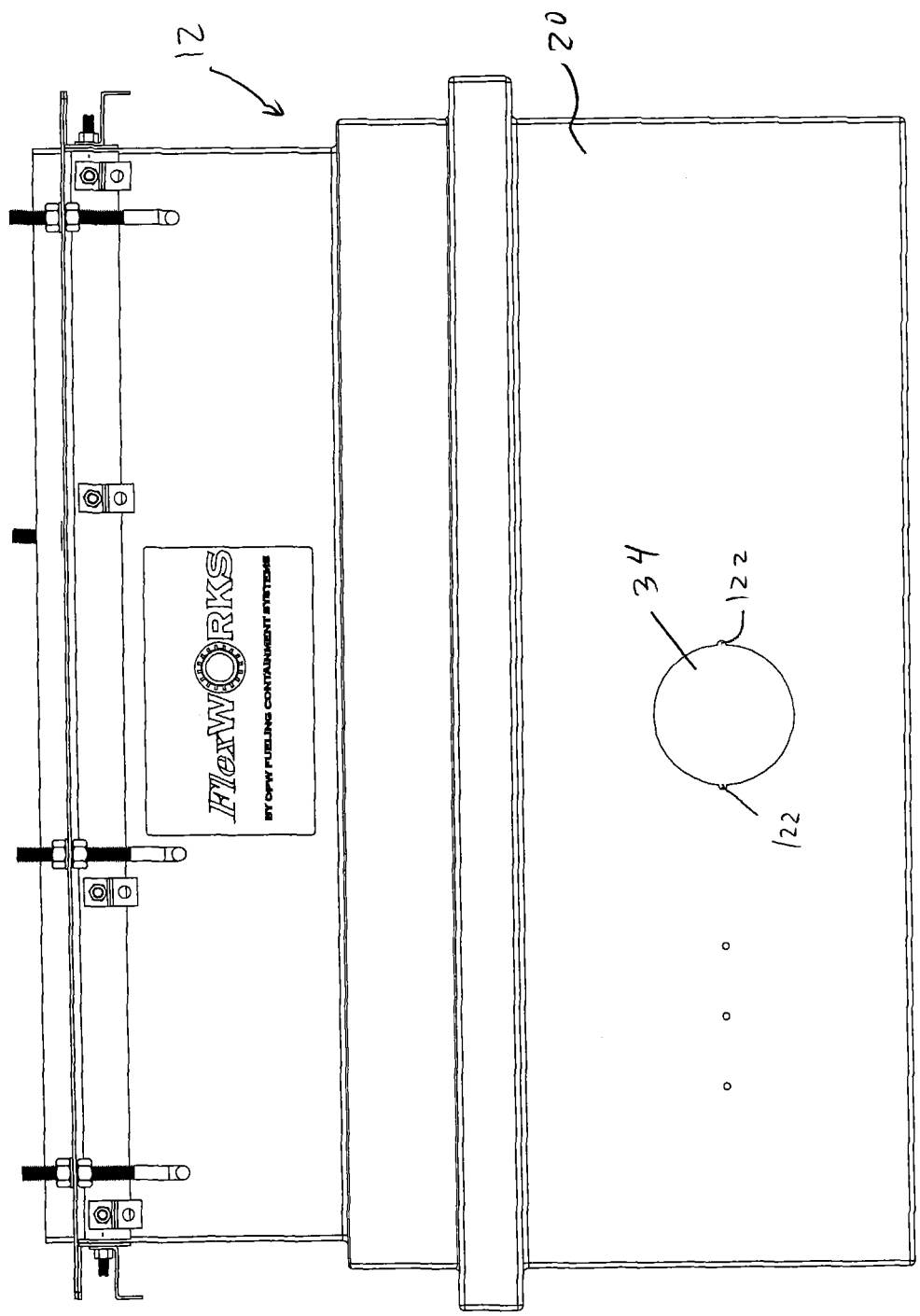
FIG. 9 is a front view of a sump wall which is configured to receive the sump fitting of FIG. 8 therein, showing a locking feature thereof.

In this embodiment shown in FIGS. 7 and 8, the studs 54 and nuts 62 are not utilized, since the body 32 is a unitary component, and the sump wall 20 and containment seals 64 may therefore lack the openings 60, 66, respectively As best shown in FIG. 8, the body 32 may include a pair of protrusions 120 thereon (only one of which is shown in FIG. 8) spaced about 180 degrees apart and positioned adjacent to the flange 52. The opening 34 of the sump 12, as shown in FIG. 9, may be generally circular but include recesses 122 sized and located to closely receive the protrusions 120 therein. In this manner, when the body 32 of the embodiments of FIGS. 7 and 8 is received in the opening 34 shown in FIG. 9, the body 32 is radially held in place and prevented from spinning during assembly, or after installation, of the sump entry fitting 10'. One or both of the containment seals 64 may include corresponding grooves to receive the protrusions 120 therein.

FIGS. 10-15 illustrate another embodiment of the sump entry fitting 10". In this embodiment, the body 32 is somewhat similar to that of the embodiment of FIGS. 7 and 8, and is a one-piece unitary body 32 which extends continuously from one side of the wall 20/opening 34 to the other. A sleeve 116 is threadably coupled to an outer surface of the body 32 to press the containment seals 64 into sealing engagement with the wall 20, similar to the embodiment of FIGS. 7 and 8 described above. In this embodiment, however, the sump entry fitting 10" includes a ball 130 positioned within the body 32 and sealingly receiving the pipe 18 therethrough. In particular, the ball 130 may include a spherical or partially spherical outer surface 134, with a generally cylindrical opening 136 therethrough which closely and sealingly receives the pipe 18 therein.

Figure 14:
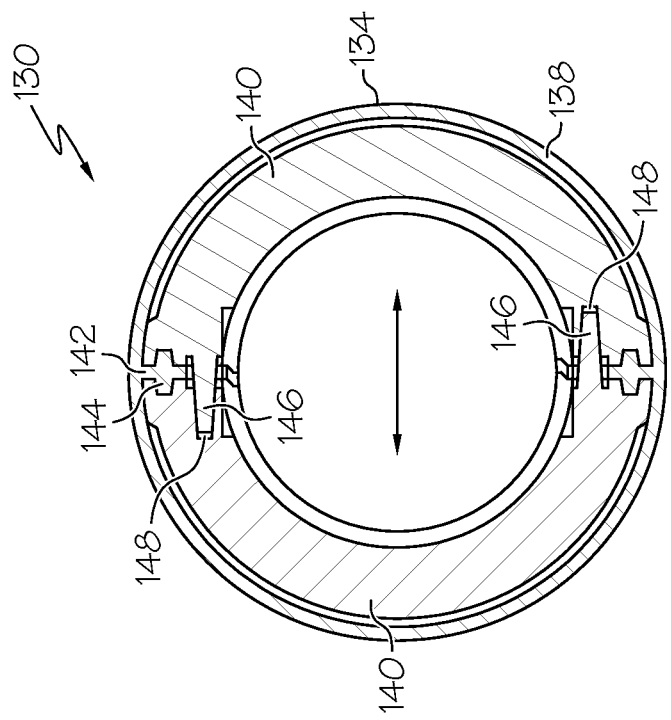
FIG. 14 is a side cross section of the ball of FIG. 13, taken along line 14-14.
Figure 13:
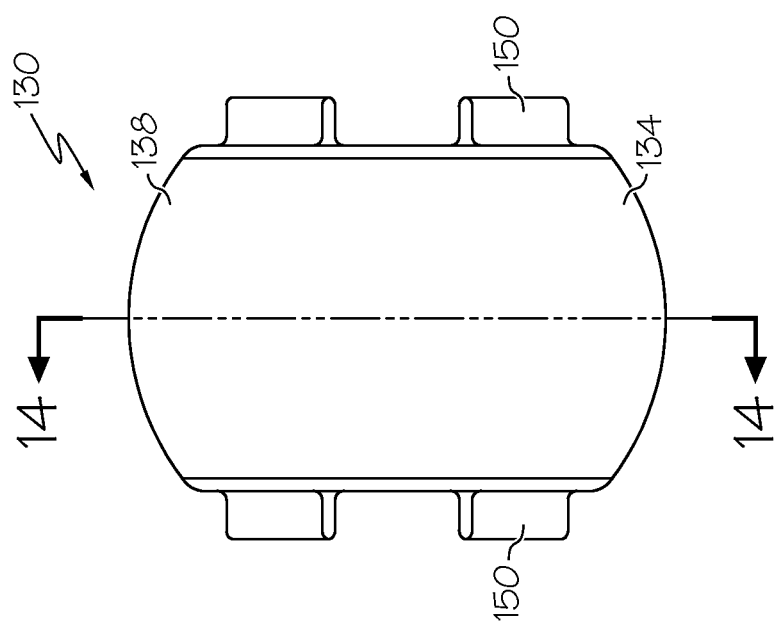
FIG. 13 is a side view of the ball of the sump entry fitting of FIG. 10.
Figure 15:
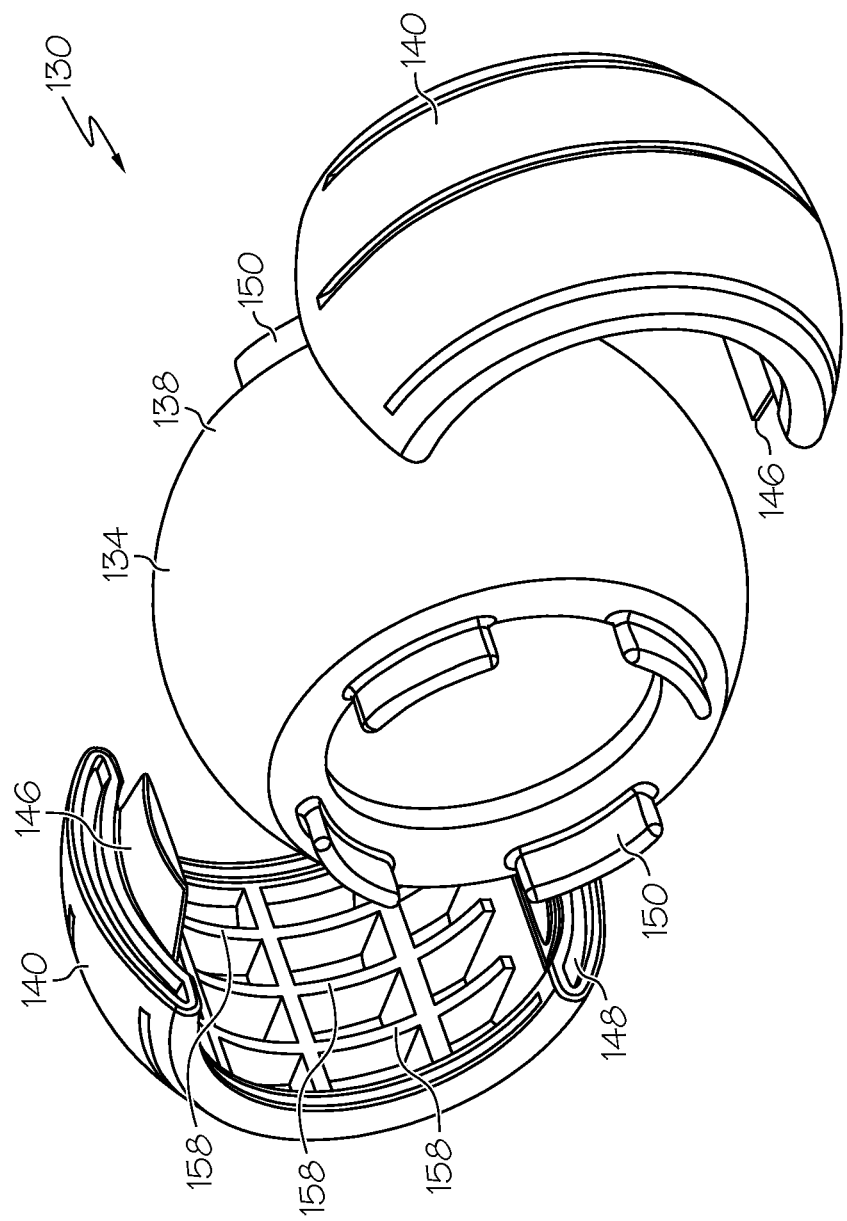
FIG. 15 is an exploded perspective view of the ball of FIG. 13.

As best shown in FIGS. 13-15, in one embodiment the ball 130 includes a generally continuous flexible casing 138 generally surrounding two ball portions 140. As best shown in FIG. 14, the outer casing 138 extends entirely circumferentially around the ball portions 140, and includes a lip 142 extending axially inwardly, forming a flange 144 which is closely received in correspondingly-shaped grooves in each of the ball portions 140 to hold the outer casing 138 in place. The outer casing 138 can be made of any of a wide variety of materials, including the materials outlined above as the materials for the seal 44. The two ball portions 140 can be made of any of a wide variety of materials, including the same materials as those outlined above for the body 32 and seal insert 46, such as glass filled nylon.

Each of the ball portions 140 includes a protrusion 146 which is closely received in a corresponding groove 148 of the other ball portion 140. In this manner, due to the flexibility of the outer casing 138, each ball portion 140 is free to slide in and out relative to each other in a generally radial direction, as shown by the arrow in FIG. 14. FIG. 15 is an exploded view of the ball 130 in which the ball portions 140 are shown outside the outer casing 138 for illustrative purposes, but it should be understood that when properly assembled the ball portions 140 would be positioned inside the outer casing 138 as shown in FIG. 14. The ball 130 may have a set of axially-extending feet 150, which act as a gripping surface for enabling manual extraction of the ball 130 out of the body 32.

Figure 10:
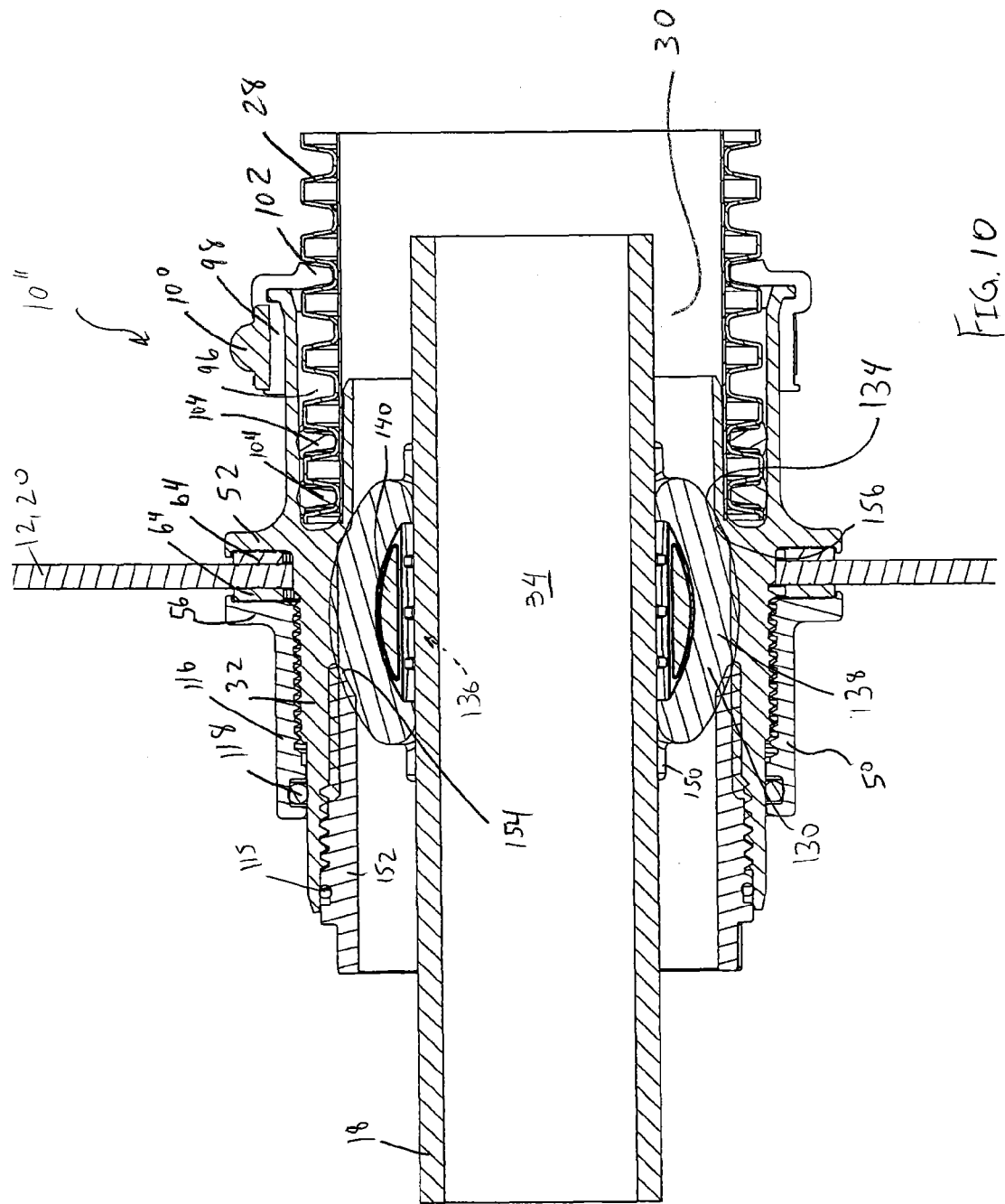
FIG. 10 is a side cross section of a sump and pipe with another alternate sump entry fitting.

In order to assemble the sump entry fitting 10" as shown in FIGS. 10 and 11, the body 32 is first inserted into the opening 34 from the outside of the opening 34 until the outer flange 52 traps the associated containment seal 64 against the wall 20. The sleeve 50 is then threaded onto the body 32 such that the body 32 sealingly engages the wall via both containment seals 64. Next, the ball 130 is inserted into the body, and an insert 152 is threaded loosely into the body 32. The insert 152 is somewhat analogous to the insert 110 of the embodiment of FIGS. 7 and 8, but lacks the flange 76, and extends axially deeper into the body 32.

After the insert 152 is loosely threaded in place, the pipe 18 is passed through the central opening 136 of the ball 130. The insert 152 is then threaded deeper into the body 32, which causes the leading edge 154 of the insert 152 to engage the outer surface 134 of the ball 130. The axially outer end of the ball 130 is positioned adjacent a lip 156 of the body 32 such that the ball 130 is trapped between the lip 156 and the insert 152. Further insertion of the insert 152 thereby causes the ball portions 140 of the ball 130 to move radially inwardly toward each other, thereby tightly clamping around the pipe 18 and causing the ball portions 140 to form one or multiple seals with the pipe 18 around its circumference.

The leading edge 154 of the insert 152 engages the ball 130 about a circular contact area, while the lip 156 similarly provides a circular contact area. The contact surfaces 154, 156 thereby cooperate to trap the ball 130 in place and act as a socket in which the ball 130 can pivot, as can be seen in comparing FIGS. 10 and 11.

When the insert 152 is fully threaded in place, the ball 130 may form a generally spherical or partially spherical shape in its outer surface 134 that is trapped in the body 32. The resultant ball-and-socket arrangement enables the pipe 18 to be easily and smoothly rotated or pivoted in the body 32, providing ease of installation. The body 32 and insert 152 form a socket in which the ball 130 can pivot (i.e. about the central axis 151 of the sump fitting 10" as shown in FIG. 11) and/or rotate/spin (i.e. about the longitudinal axis 153), which provides great freedom of motion to allow the pipe 18 to take any of a wide variety of configurations or angles within the sump entry fitting 10".

The sump entry fitting 10" of this embodiment thereby provides a system which can be easily assembled, yet provides great flexibility and ease of movement of the pipe 18 due to the ball 130-and-socket design. The "split ball" design allows the ball 130 to receive the pipe 18 therethrough, and then be tightened down over the pipe 18 in a sealed manner. Moreover, although the illustrated embodiment shows the ball 130 including two ball portions 140, more than two body portions 140 may be implemented as desired. Further alternately, if desired, the ball 130 may be made of only a single portion, and thus take the form of a single-piece ball with an opening therethrough, such as a solid ball or the like. In this case the ball 130 may be made of the generally flexible materials outlined above, and may be compressed about the pipe 18 to form a seal therewith when the insert 152 is fully inserted, and enable pivoting/rotation of the pipe 18.

When fully assembled, the sump entry fitting 10" provides two independently sealed areas within the fitting, one area positioned on the axially inside side of the ball 130, and the other area positioned on the axially outside side of the ball 130, thereby allowing for precise testing to track or determine any leaks within the system.

FIG. 16 illustrates a package or container 160, folded flat, which may be used to store or ship a sump-entry fitting, or in which a sump-entry fitting may be sold, including but not necessarily limited to the fittings 10, 10', 10" disclosed herein. The package/container 160 may be assembled into a generally rectangular prism for use, but is shown folded flat in FIG. 16. As can be seen, one of the panels 162 of the package 160 may have a template 164 formed or printed thereon. The template 164 can be utilized by tearing the panel 162 along the fold lines, tear lines, or lines of weakness 166 to free the panel 162 from the rest of the package 160, and then placing the template 164 at the appropriate location of the sump wall 20. The template 164 may be entirely printed/carried on only a single panel 162 for ease of separation and use. However, the template 164 may also be able to be used without tearing/separation.

The template 164 provides the proper spacing and location for holes and openings (such as holes/openings 34, 60) to be formed in the sump wall 20 during installation of a sump entry fitting 10. In this manner the package 160 serves the dual purpose of storing the fitting and serving as a template. This system also reduces part count of the entire sump package, and ensure that the template 164 is always properly provided with its associated parts.

Having described the invention in detail and by reference to certain embodiments, it will be apparent that modifications and variations thereof are possible without departing from the scope of the invention.

What is claimed is:

1. An entry fitting system comprising:
   a generally rigid body configured to extend through an opening of a containment chamber;
   a generally flexible seal configured to be positioned in or coupled to said body, said seal including a seal body and an outer flange with a recess positioned radially therebetween; and
   an insert including a protrusion, said insert being configured to be coupled to said body such that said protrusion is received in said recess to cause said seal to sealingly engage a pipe received through said body, wherein said seal is configured to enable said sealingly engaged pipe to be oriented in a non-parallel position with respect to a central axis of said body.

2. The system of claim 1 wherein said insert is configured to urge said flexible seal radially inwardly as said insert is coupled to said body.

3. The system of claim 2 wherein said insert is threadably attachable to said body such that threading said insert to said body causes said insert to engage said seal and cause said seal to sealingly engage said pipe.

4. The system of claim 3 wherein said insert is threadably attachable to an outer surface of said body.

5. The system of claim 1 wherein said insert is generally rigid.

6. The system of claim 1 wherein said body is made from material having a Young's modulus of at least 15,000 psi, and said seal is made from material having a hardness less than 100 shore A.

7. The system of claim 1 wherein said body is made of glass-filled nylon, ceramic-filled nylon, metal or polyethylene, and said seal is made from rubber, rubber-based materials, synthetic rubber, urethane, thermoplastic elastomers or other elastomeric materials.

8. The system of claim 1 wherein said seal is configured to enable said pipe to form an angle of at least 5 degrees relative to said central axis.

9. The system of claim 1 wherein said body is configured to be removably attached to said containment chamber.

10. The system of claim 1 wherein said body includes a first portion configured to be positioned generally on a first side of said containment chamber and a second portion configured to be positioned generally on a second side of said containment chamber.

11. The system of claim 10 wherein said first portion is slidably receivable in said second portion.

12. The system of claim 10 wherein said first and second portions are configured to form a generally sealed cavity with a wall of said containment chamber when said system is mounted to said containment chamber such that the integrity of a seal formed between said fitting system and said containment chamber is testable by measuring a pressure in said cavity.

13. The system of claim 10 wherein said first and second portions are configured to be coupled together by a set of threaded members extending at least partially therethrough and extending through a wall of said containment chamber.

14. The system of claim 1 wherein said body is configured to sealingly engage said opening of said containment chamber.

15. The system of claim 1 further comprising said containment chamber and said pipe, and wherein said body sealingly extends through said opening of said containment chamber, said pipe extends through said body, and said seal sealingly engages said pipe.

16. The system of claim 1 wherein said body has a first axial end and a second axial end, and wherein said seal is configured to be positioned at or adjacent to said first axial end, and wherein said second axial end of said body is configured to receive an end of an outer sleeve therein, said outer sleeve being generally coaxial with said pipe.

17. The system of claim 1 further comprising a grommet insert configured to be positioned in said body and receive said seal therein.

18. The system of claim 1 further comprising a containment seal and a sleeve configured to be coupled to said body to press said containment seal into sealing engagement with said containment chamber.

19. The system of claim 1 wherein said body is a unitary one-piece component.

20. The system of claim 1 wherein said seal is configured to enable said sealingly engaged pipe to be oriented in a parallel position with respect to a central axis of said body.

21. The system of claim 1 wherein said seal body and said outer flange overlap in a radial direction.

22. The system of claim 1 wherein said protrusion is configured to present an increased radial thickness as said insert is coupled to said body to cause said seal to sealingly engage said pipe.

23. The system of claim 22 wherein said protrusion is a radially inner-most surface of said insert that is configured to engage said seal.

24. An entry fitting system comprising:
  a generally rigid body configured to extend through an opening of a containment chamber;
  a generally flexible seal configured to be positioned in or coupled to said body; and
  an insert configured to be positioned at least partially inside said body to cause said seal to sealingly engage a pipe received through said body, said insert having an inner surface which is the radially inner-most surface of said insert that engages said seal, and wherein said seal is configured to be radially positioned between said radially inner-most surface and said pipe.

25. The system of claim 24 wherein said radially inner-most surface is a radially inner-most surface of said insert along any radial line of said insert.

26. An entry fitting system comprising:
  a containment chamber having an opening formed therethrough;
  a generally rigid body sealingly positioned in and extending through said opening;
  a pipe extending through said body;
  an insert; and
  a generally flexible seal sealingly positioned radially between said body and said pipe, wherein said seal is configured to enable said pipe to be oriented in a non-parallel position with respect to a central axis of said body, said insert having an inner surface which is the radially inner-most surface of said insert that engages said seal, and wherein said seal is radially positioned between said radially inner-most surface and said pipe.

27. The system of claim 26 wherein at least part of said seal is positioned radially between said insert and said pipe.

28. The system of claim 26 wherein said seal includes a seal body and an outer flange with a recess positioned radially therebetween, and wherein at least part of said insert is positioned in said recess, and wherein said seal body, said outer flange and said at least part of said insert overlap in a radial direction.

29. A method for assembling an entry fitting comprising:
  accessing an entry fitting system comprising a generally rigid body, a generally flexible seal having a seal body and an outer flange with a recess positioned radially therebetween, and an insert;
  positioning said body in an opening of a containment chamber;
  positioning said seal in said body;
  positioning a pipe in said seal; and
  coupling said insert to said body to such that said at least part of said insert is received in said recess to thereby cause said seal to sealingly engage said pipe, wherein after said coupling step said seal is configured to enable said pipe to be oriented in a non-parallel position with respect to a central axis of said body.

\* \* \* \* \*